US005661297A

United States Patent [19]

Aleshire et al.

[11] Patent Number: 5,661,297
[45] Date of Patent: Aug. 26, 1997

[54] BAR CODE SCANNER WITH SEALED HOUSING

[75] Inventors: Rex A. Aleshire, Buford; Donald A. Collins, Jr., Duluth, both of Ga.

[73] Assignee: NCR Corporation, Dayton, Ohio

[21] Appl. No.: 392,582

[22] Filed: Feb. 23, 1995

[51] Int. Cl.⁶ ........................................... H01J 5/02
[52] U.S. Cl. ..................... 250/239; 250/235; 235/462; 359/513
[58] Field of Search ................... 250/239, 235, 250/236; 235/467, 383, 462, 472; 359/513, 507, 509

[56] References Cited

U.S. PATENT DOCUMENTS

| | | | |
|---|---|---|---|
| 4,656,344 | 4/1987 | Mergenthaler et al. | 235/383 |
| 5,042,821 | 8/1991 | Bontly | 235/462 |
| 5,086,879 | 2/1992 | Latimer et al. | 235/462 |
| 5,235,168 | 8/1993 | Bobba | 235/467 |
| 5,343,029 | 8/1994 | Katoh et al. | 235/467 |
| 5,426,282 | 6/1995 | Humble | 235/383 |

*Primary Examiner*—Que Le
*Attorney, Agent, or Firm*—Paul W. Martin

[57] ABSTRACT

A bar code scanner which is sealed against moisture and dust intrusion. The scanner includes a housing having a base portion and a lid portion. A mirror basket is located within the base portion. A seal between the lid portion and the base portion prevents dust and fluids from entering the mirror basket and the housing when the lid is secured to the base portion. A circuit board seal prevents dust and fluids from entering an aperture in the mirror basket through which a laser and a detector on the circuit board protrude.

5 Claims, 4 Drawing Sheets

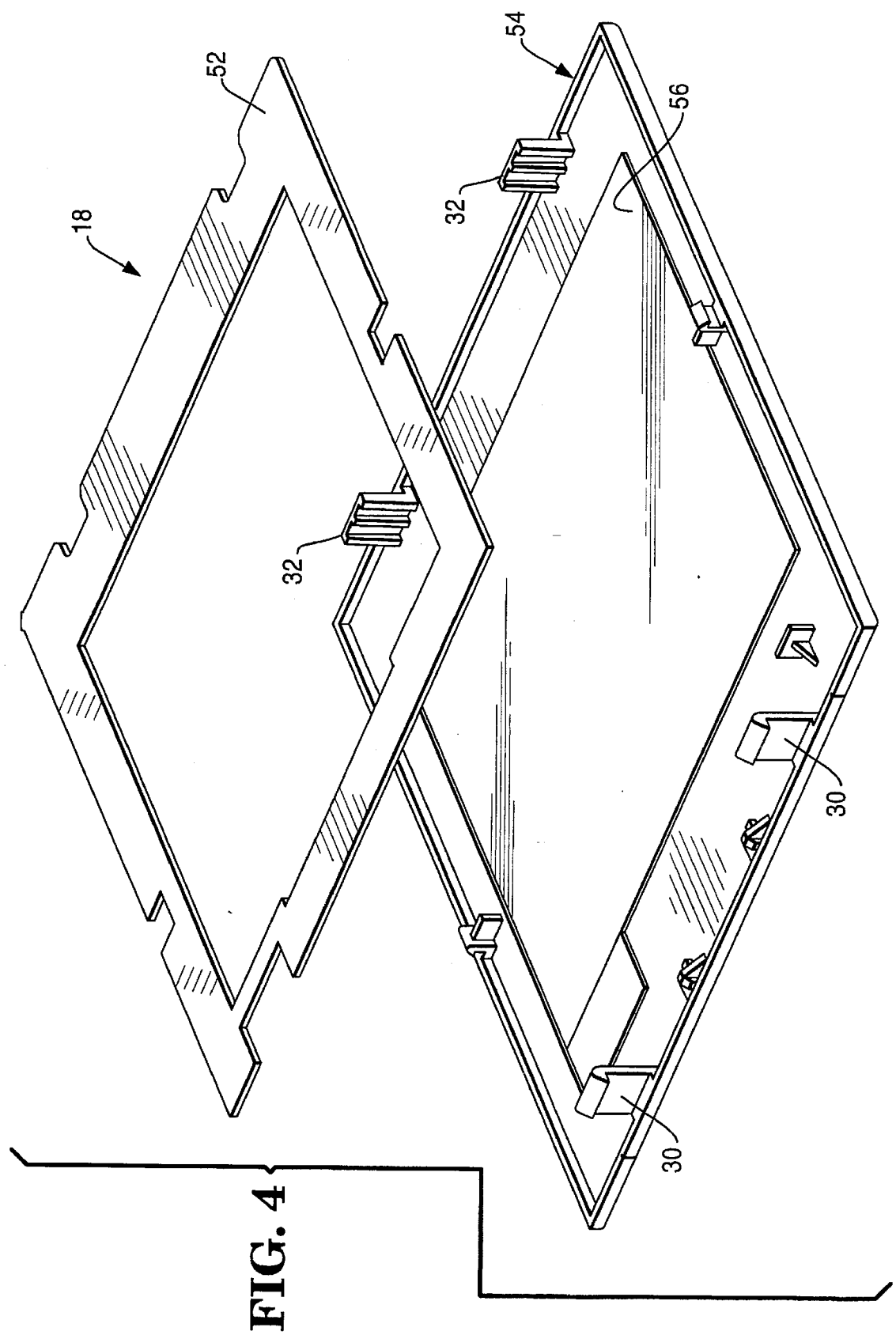

1

BAR CODE SCANNER WITH SEALED HOUSING

CROSS REFERENCE TO RELATED APPLICATIONS

The present invention is related to the following commonly assigned and co-pending U.S. applications:

"Modular Bar Code Scanner and Scale Assembly", invented by Collins et al., having a Ser. No. of 08/392,598 and filed Feb. 23 1995; and "Vertically Mounted Bar Code Scanner Assembly", invented by Collins et al,, having a Ser. No. of 08/392,567 and filed Feb. 23, 1995.

BACKGROUND OF THE INVENTION

The present invention relates to optical bar code scanners, and more specifically to a bar code scanner with a sealed housing.

Bar code scanners are well known for their usefulness in retail checkout and inventory control. Bar code scanners generally employ a single laser source, the light from which is collimated and focused to produce a scanning beam. They may additionally employ a mirrored spinner to direct the beam against a plurality of stationary mirrors, and a detector to collect the beam after it is reflected by a bar code label. The pattern produced by such a scanner is characterized by lines oriented at various angles to one another.

Bar code scanners are prone to damage from fluid spills and dust intrusion, which can damage electronic components and obscure mirrors. Scanners with integrated scales are especially at risk.

Therefore, it would be desirable to provide a bar code scanner with a sealed housing which minimizes fluid and dust intrusion, regardless of whether the scanner is equipped with a scale.

SUMMARY OF THE INVENTION

In accordance with the teachings of the present invention, a bar code scanner with a sealed housing is provided. The scanner includes a housing having a base portion and a lid portion. A mirror basket is located within the base portion. A seal between the lid portion and the base portion prevents dust and fluids from entering the mirror basket and the housing when the lid is secured to the base portion. A circuit board seal prevents dust and fluids from entering an aperture in the mirror basket through which a laser and a detector on the circuit board protrude.

It is accordingly an object of the present invention to provide a bar code scanner with a sealed housing.

It is another object of the present invention to minimize fluid and dust intrusion in a scanner, regardless of whether the scanner has a scale.

BRIEF DESCRIPTION OF THE DRAWING

Additional benefits and advantages of the present invention will become apparent to those skilled in the art to which this invention relates from the subsequent description of the preferred embodiments and the appended claims, taken in conjunction with the accompanying drawings, in which:

FIG. 4 is a perspective view of a lid of the scanner.

DETAILED DESCRIPTION OF THE PREFERRED EMBODIMENT

Figure 1:
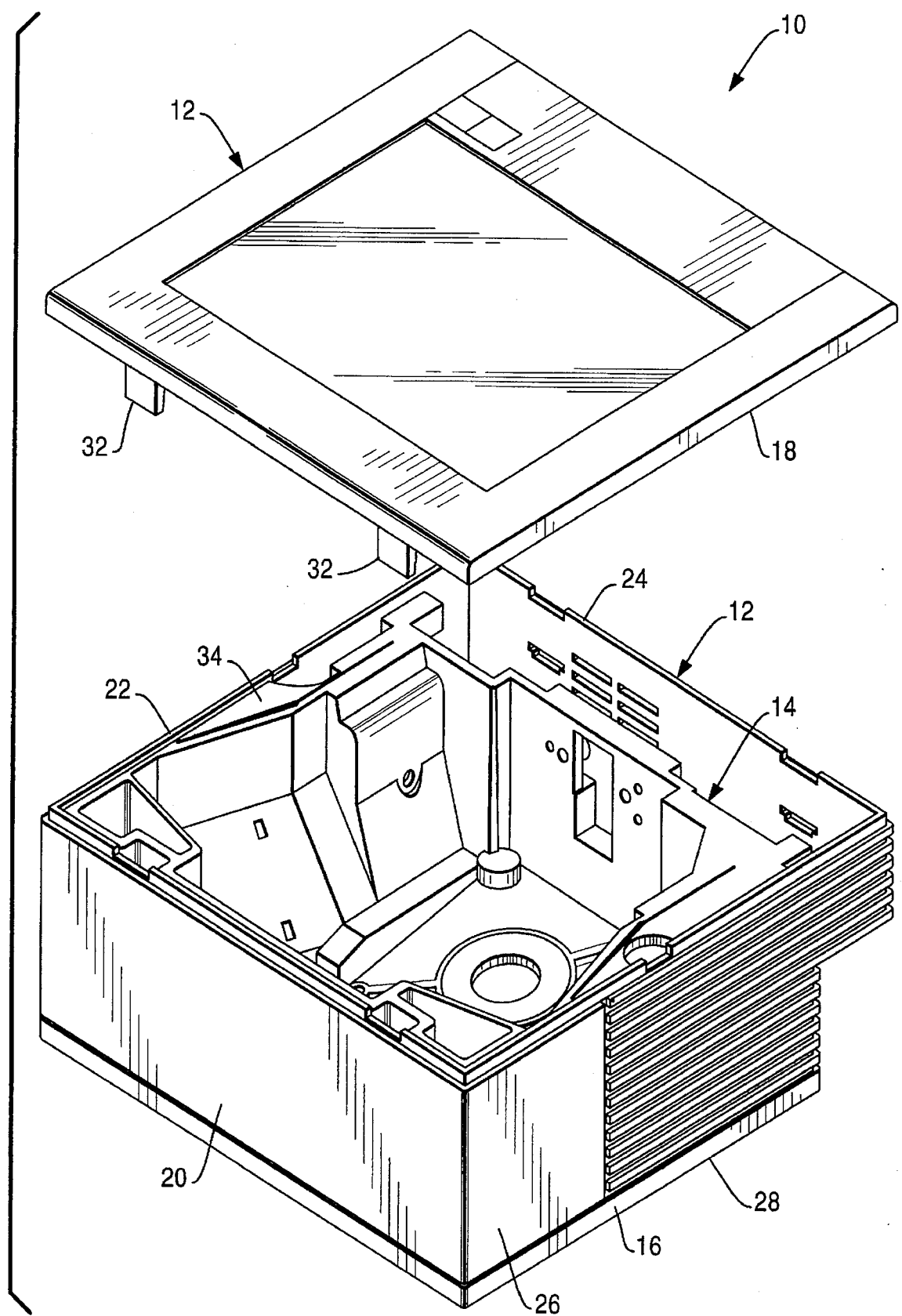
FIG. 1 is a perspective view of the bar code scanner of the present invention.

Turning now to FIG. 1, scanner includes housing 12 and mirror basket assembly 14.

Housing 12 is generally box-like in shape and includes a base portion 16 and a lid portion 18. Base portion 16 includes four side walls 20–26 and a bottom wall 28. Lid portion 18 contains tabs 30 and 32 (FIG. 4) which engage base portion 16 to secure lid portion 18 to base portion 16.

Figure 2:
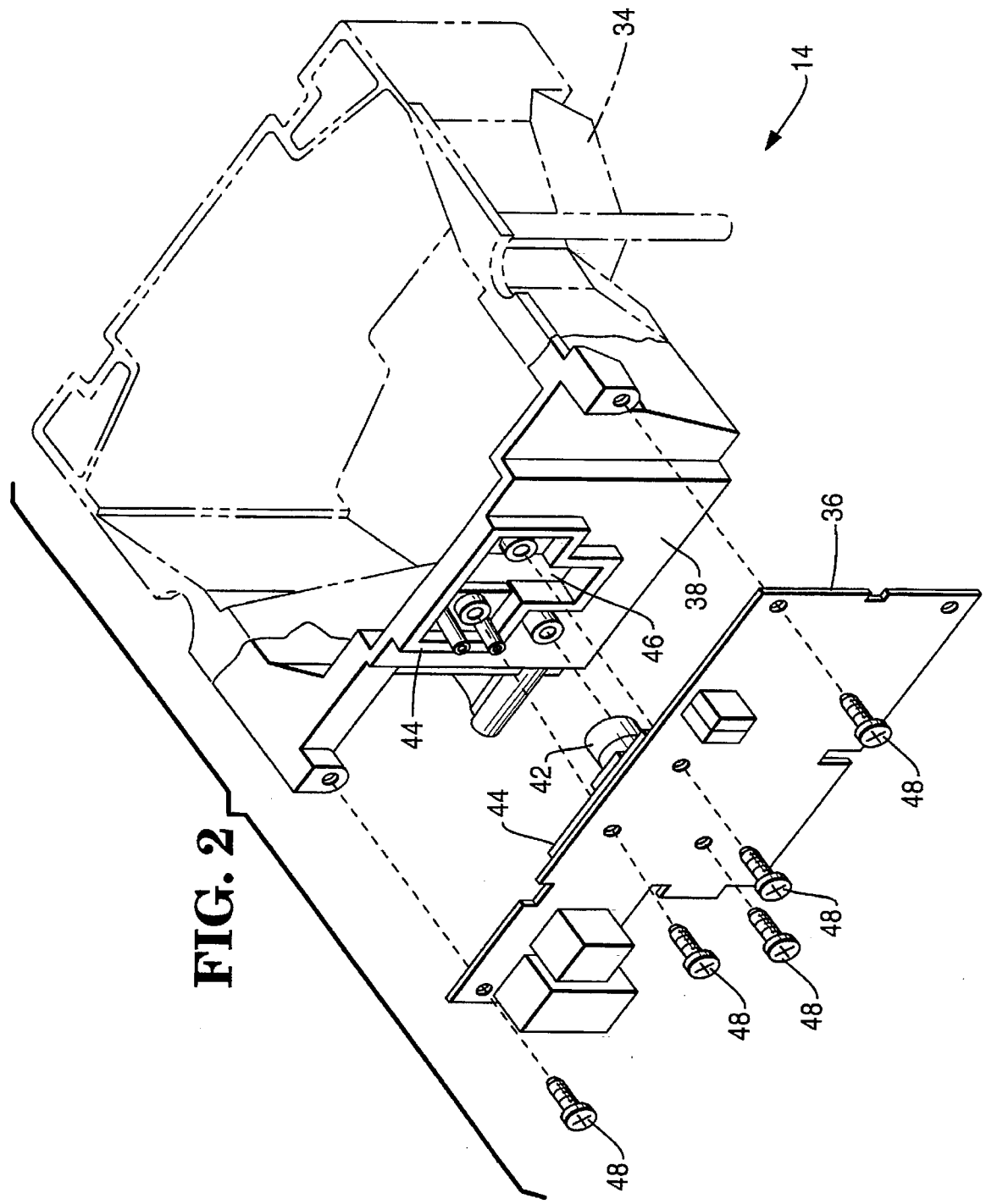
FIG. 2 is a perspective view of a mirror basket assembly within the scanner.
Figure 3:
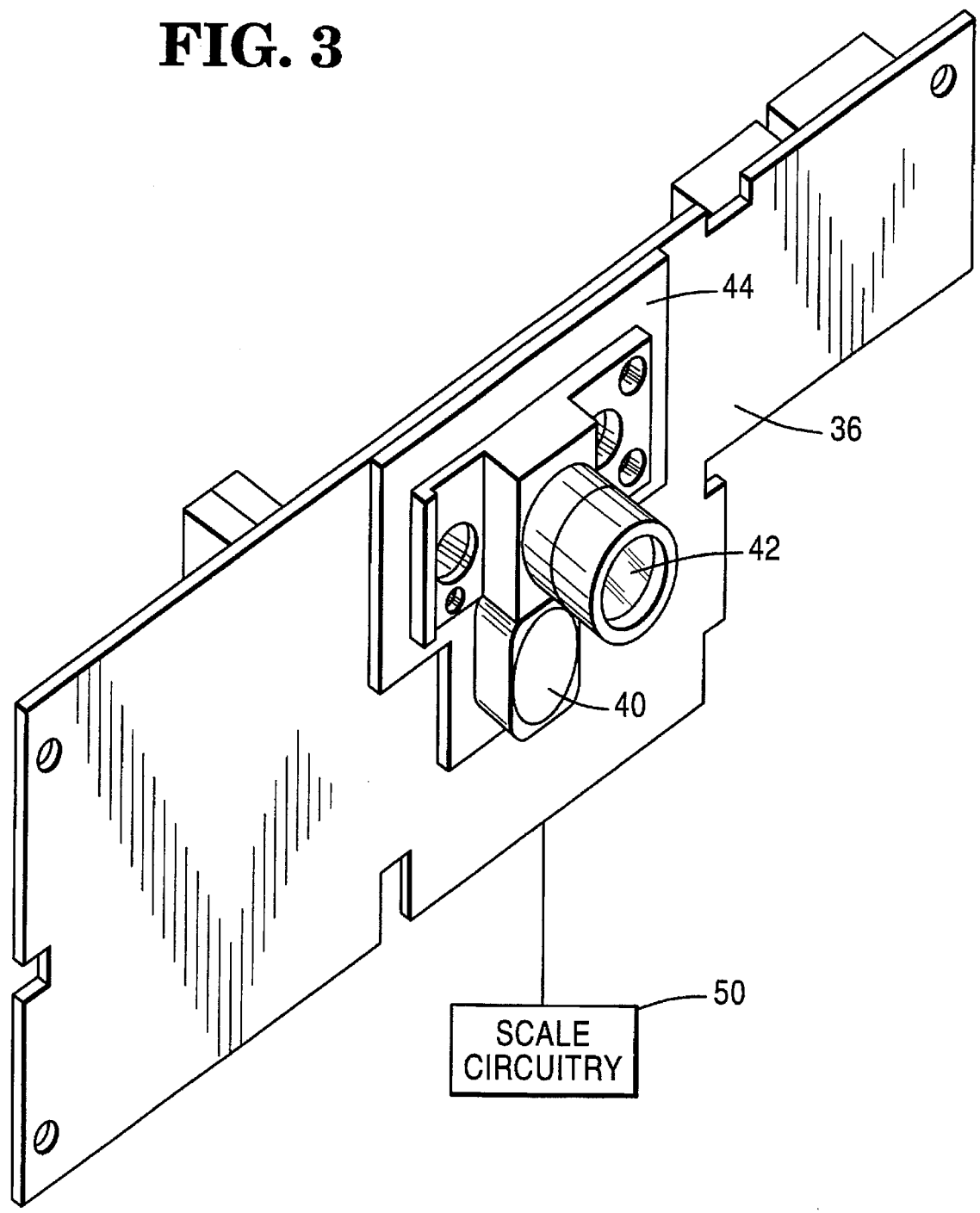
FIG. 3 is a front view of a circuit board within the mirror basket assembly.

Mirror basket assembly 14 includes mirror basket 34 and scanner circuit board 36 (FIGS. 2 and 3). Mirror basket 34 is preferably made of light weight plastic and is generally square shaped to fit snugly within base portion 16. Mirror basket 34 has a height which is the same as the height of base portion 16.

Turning now to FIGS. 2 and 3, scanner circuit board 36 attaches to side 38 of mirror basket 34 and includes laser 40 and detector 42. Side 38 includes aperture 46 through which laser 40 and 42 extend into mirror basket 34. Circuit board seal 44 is preferably made of foam and prevents dust and fluid intrusion through aperture 46. Circuit board 36 is secured to mirror basket 34 using screws 48.

Circuit board 36 also connects to scale circuitry 50 which is included within a separate housing to further ensure the sealed integrity of housing 12 when scanner 10 is equipped with a scale (FIG. 4).

Turning now to FIG. 4, lid portion 18 includes lid seal 52 and lid frame 54. Lid seal 52 attaches to lid frame 54 and prevents fluids and dust from entering housing 12 and mirror basket 34 when lid portion 18 is secured to base portion 16. Thus, lid seal 52 and circuit board seal 44 seal a first cavity within mirror basket 34. Lid seal 52 seals a second cavity containing circuit board 36.

Lid seal 52 is preferably made of a foam material. Lid frame 54 also includes glass window 56.

Although the present invention has been described with particular reference to certain preferred embodiments thereof, variations and modifications of the present invention can be effected within the spirit and scope of the following claims.

What is claimed is:

1. A bar code scanner comprising:
    a housing having a base portion and a lid portion;
    a mirror basket within the base portion; and
    a seal between the lid portion and the base portion which prevents dust and fluids from entering the housing and the mirror basket when the lid is secured to the base portion.

2. The bar code scanner as recited in claim 1, further comprising:
    a circuit board within the housing and attached to the mirror basket;
    wherein the mirror basket includes a side having an aperture;
    wherein the circuit board contains a laser and a detector which protrude through the aperture in the mirror basket; and
    another seal around the laser and the detector which prevents dust and fluids from entering the mirror basket when the circuit board is secured to the mirror basket.

3. A bar code scanner assembly comprising:

a housing having a base portion and a lid portion;

a mirror basket within the base portion;

a seal between the lid portion and the base portion which prevents dust and fluids from entering the housing and the mirror basket when the lid is secured to the base portion; and a scale located outside the housing.

4. A bar code scanner comprising:

a housing having a base portion and a lid portion;

a mirror basket within the base portion;

a seal between the lid portion and the mirror basket which prevents dust and fluids from entering the mirror basket when the lid is secured to the base portion;

a circuit board within the base portion and attached to the mirror basket;

wherein the mirror basket includes a side having an aperture;

wherein the circuit board contains a laser and a detector which protrude through the aperture in the mirror basket; and another seal around the laser and the detector which prevents dust and fluids from entering the mirror basket when the circuit board is secured to the mirror basket.

5. A bar code scanner comprising:

a housing having a base portion and a lid portion;

a mirror basket within the base portion; and a seal between the lid portion and the mirror basket which prevents dust and fluids from entering the mirror basket when the lid is secured to the base portion.

* * * * *